Sept. 29, 1942. D. E. LARSON 2,297,003
PRESSURE RELIEF VALVE
Filed Feb. 20, 1942

Inventor:
Donald E. Larson,
By Christen, Wiles, Mawer & Hirschl
Attys.

Patented Sept. 29, 1942

2,297,003

UNITED STATES PATENT OFFICE 2,297,003

PRESSURE RELIEF VALVE

Donald E. Larson, Chicago, Ill., assignor to Chicago Bridge & Iron Company, a corporation of Illinois Application February 20, 1942, Serial No. 431,628

3 Claims. (Cl. 137—53)

This invention relates to improvements in pressure relief valves and more especially such a valve adapted for use on a pressure container. The valve may be used, for example, as an emergency pressure relief vent for storage tanks containing gases or volatile liquid.

My emergency vent may be used, for example, for operation with pressures from 2.5 to 15 lbs. in cases where such a vent is required by law or for purposes of relief of vapors created by fire exposure. My improved vent is exceedingly dependable and reliable under all conditions of usage.

Among the features of my invention is the provision of means for applying relatively great pressure to the vent cover to hold the same in place and providing rather delicate means for releasing the cover adapted to be operated by internal pressure in excess of a predetermined point.

Other features and advantages will appear more fully as I proceed with the specification.

Figure 1:
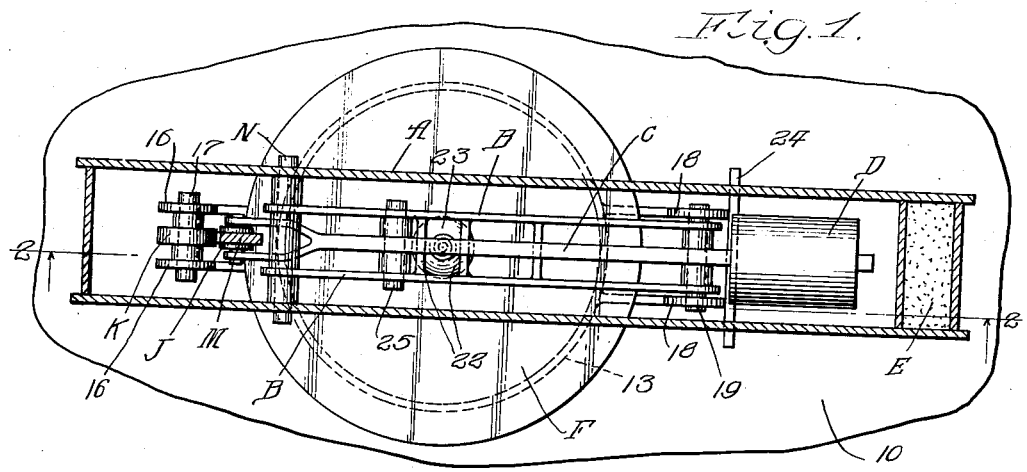
Figure 2:
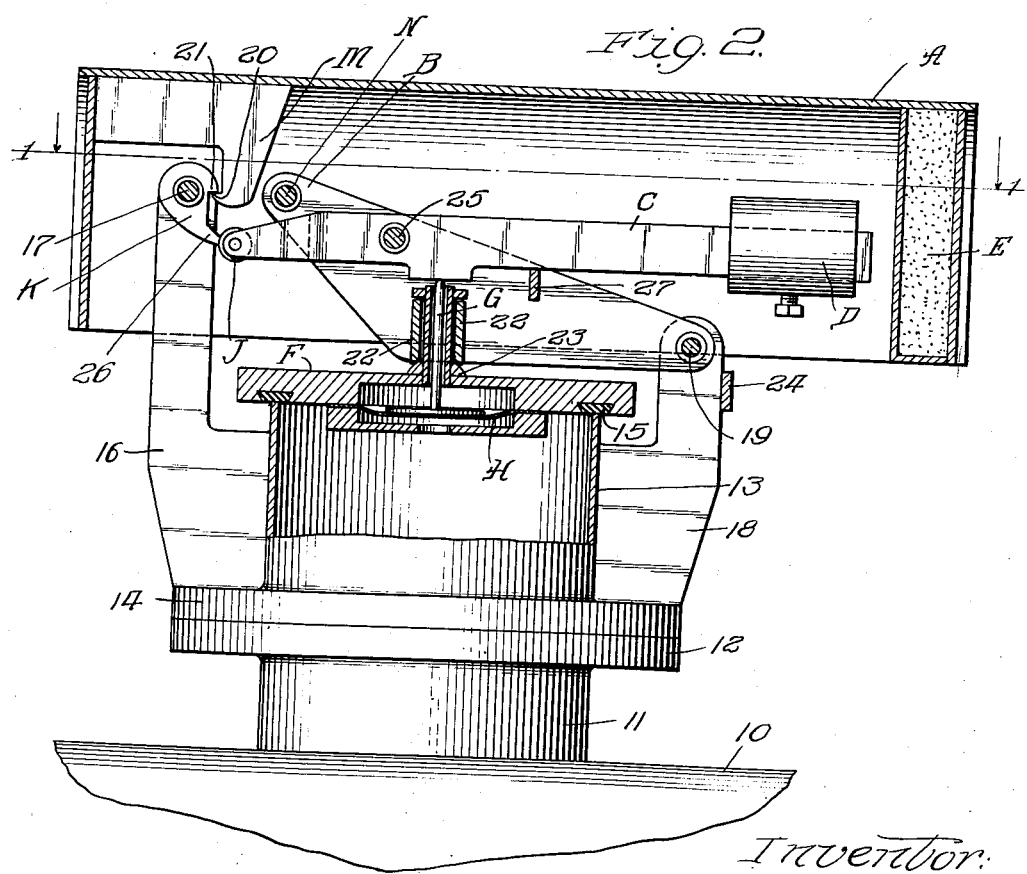

In that form of device embodying the features of my invention shown in the accompanying drawing, Figure 1 is a horizontal sectional view taken as indicated by the line 1 of Figure 2; and Figure 2 is a vertical sectional view taken as indicated by the line 2 of Figure 1.

As shown in the drawing, 10 may indicate the roof or top of a pressure container, 11 a nipple communicating therewith, and 12 a flange on the nipple. 13 indicates a chamber, for example, a vent pipe provided with a flange 14 attached to the flange 12 in any suitable manner.

F indicates a cover over the top of the vent pipe to close the same, said cover being preferably provided with a suitable gasket 15 where it engages the edge of the vent pipe 13.

16 indicates a pair of upwardly projecting arms fastened to the vent 13 and flange 14 which carry at their upper end the rotatable trigger K mounted on the pin 17. A pair of shorter similar arms 18 are provided on the opposite side which carry the pin 19 upon which is rotatably mounted one end of the double triangular lever B. The other end of the lever B carries the pin N.

A indicates a combined cover and lever with a weight E at one end. Near the other end the lever A is connected to the ends of the pin N. Beyond this connection the lever A is provided with the depending arm M having at its lower end the hook 20 engaging the hook 21 on the rotatable trigger K.

The lever B is provided with the cross-webs 22 engaging the dome-shaped projection 23 on the cover F.

It will be seen that the parts thus described will cause the weight E to apply considerable pressure to the cover F to hold the same in place on the upper end of the vent pipe 13. This pressure is applied through the operation of the two levers A and B. The lever A is fulcrumed at 20, 21 (the locking engagement between the hook 20 on M and the hook 21 on the trigger K). This causes relatively great downward pressure on the pin N which extends through the lever B so that the webs 22, 22 on the lever B exert relatively great downward pressure on the dome-shaped member 23 on the cover F to hold the same in place.

Relatively delicate and sensitive means are provided for releasing the pressure on the cover. It will be seen that the fulcrum between the hooks 20 and 21 is releasable by rotation of the trigger K. If the trigger K is permitted to rotate in a counter-clockwise direction, the hook 21 will rise and move away from the hook 20 to release the latter. The weighted end of the lever A can then fall (by rotation about the pin N) until such weighted end comes to rest on the stop 24. This will greatly relieve the pressure on the cover F and permit it to rise and vent the tank.

The following means are provided for releasing the fulcrum 20, 21. The lever C is pivoted to the lever B by the pin 25. This lever carries the weight D at one end. The other end is provided with a roller J normally held against the tail 26 of the rotatable trigger K. The cover F is provided with a diaphragm H upon which rests a pin G extending upwardly through the cover with its upper end bearing against the lever C. 27 indicates a stop for the lever C upon which the latter normally rests. The weight D is adjustably mounted on the lever C so that it may be raised by any excess pressure in the container 10 over a predetermined point. This raising of the weight D is accomplished, of course, by pressure acting on the diaphragm H to raise the pin G to rotate the lever C on the pin 25. Such rotation will lower the roller J to release the trigger K to permit it to rotate and unlock the hooks 20, 21. When this occurs, the weight E, as above described, will fall to let the weighted end of the lever A rest on the stop 24 and pressure on the cover F will thus be relieved, permitting the cover to rise to vent the tank.

After sufficient venting occurs, the parts must be reset by hand.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A pressure relief valve, including: a chamber with a vent opening; a cover over the opening; means for applying pressure to the cover to hold the same in place, said means including a lever with a releasable fulcrum; and means operated by pressure in the chamber above a predetermined point for releasing said fulcrum, whereby the pressure applied to the cover is relieved.

2. A pressure relief valve, including: a chamber with a vent opening; a cover over the opening; means for applying pressure to the cover to hold the same in place, said means including a lever with a releasable fulcrum; a diaphragm in the cover exposed to pressure in the chamber; and means operated by said diaphragm for releasing said fulcrum to relieve the pressure applied to the cover.

3. A pressure relief valve, including: a chamber with a vent opening; a cover over the opening; means for applying pressure to the cover to hold the same in place, said means including a lever with a releasable fulcrum; a diaphragm in the cover exposed to pressure in the chamber; a weighted lever; a connection between said weighted lever and said releasable fulcrum; and means operated by said diaphragm for moving said weighted lever to release said releasable fulcrum to relieve the pressure on the cover.

DONALD E. LARSON.